United States Patent [19]

Duguet et al.

[11] 4,273,376
[45] Jun. 16, 1981

[54] CONVERTIBLE SEAT STRUCTURES FOR AUTOMOBILE VEHICLES

[75] Inventors: Pierre Duguet, Feucherolles; Christian Robert, Rueil Malmaison, both of France

[73] Assignees: Automobiles Peugeot; Societe Anonyme Automobiles Citroen, both of Paris, France

[21] Appl. No.: 108,001

[22] Filed: Dec. 28, 1979

[30] Foreign Application Priority Data

Jan. 29, 1979 [FR] France ................................ 79 02206

[51] Int. Cl.³ .............................................. B60N 1/02
[52] U.S. Cl. .................................... 296/65 R; 297/331
[58] Field of Search ......................... 296/65 R, 64, 69; 297/331, 335

[56] References Cited

U.S. PATENT DOCUMENTS 3,097,881  7/1963  Aguilar ................................. 296/69

FOREIGN PATENT DOCUMENTS 692387  8/1964  Canada ........................................ 296/69
957452  1/1957  Fed. Rep. of Germany ........ 296/65 R
2377901 8/1978  France ..................................... 297/335

Primary Examiner—Randolph A. Reese
Assistant Examiner—Ross Weaver
Attorney, Agent, or Firm—Burns, Doane, Swecker & Mathis

[57] ABSTRACT

The invention concerns seat structures comprising a seat mounted to pivot through about 180° about a transverse axis located in the vicinity of its front part and a backrest which is capable of being swung over forwardly through about 90° about a transverse axis located adjacent its lower part. According to the invention, on at least one side of the seat there is provided a handle which is mounted on the seat to pivot about a transverse axis, this handle being associated with a protecting panel which is disposed flat under the seat in the normal position of use and is raisable so as to be roughly perpendicular to the seat in the utility position. In this position, the handle defines a support surface for the seat in the utility position.

Application to vehicles of the semi-utility or break type.

8 Claims, 6 Drawing Figures

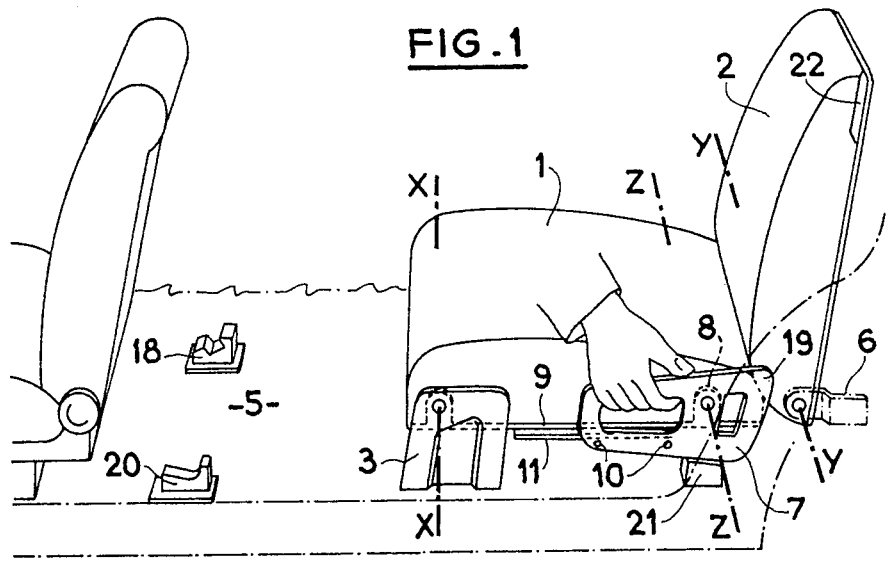
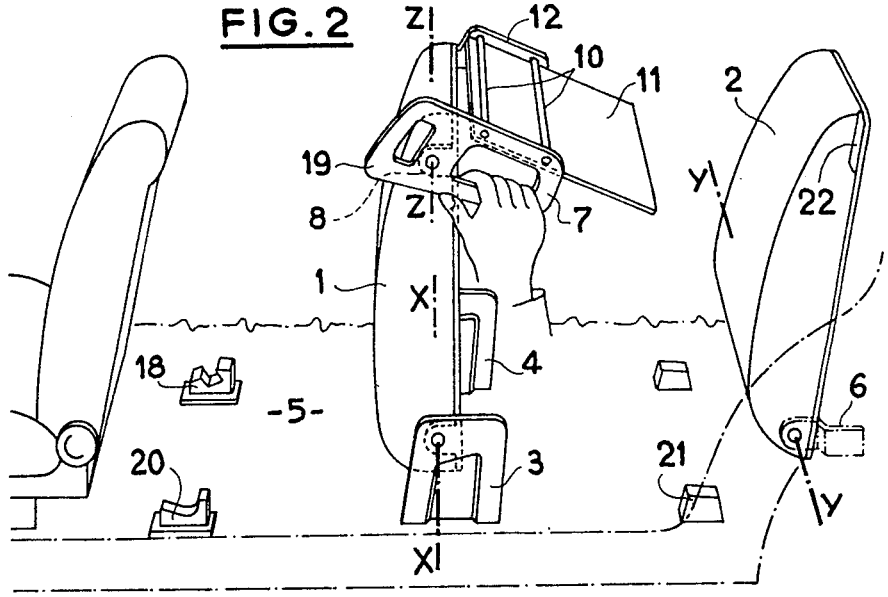

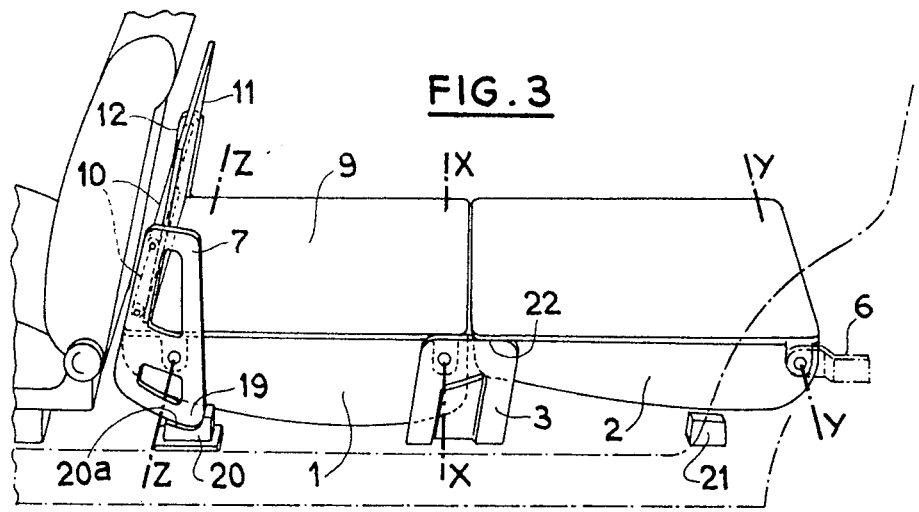
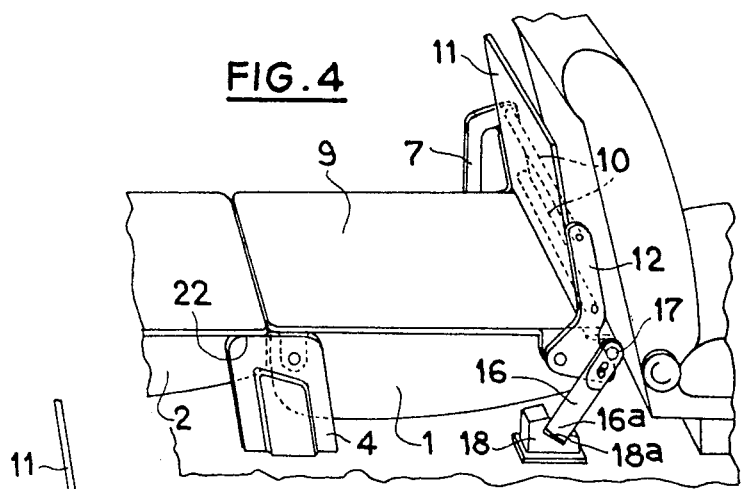
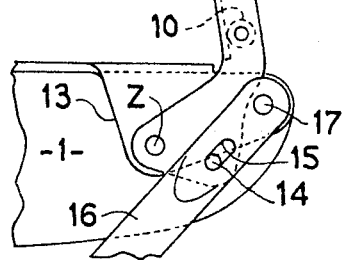
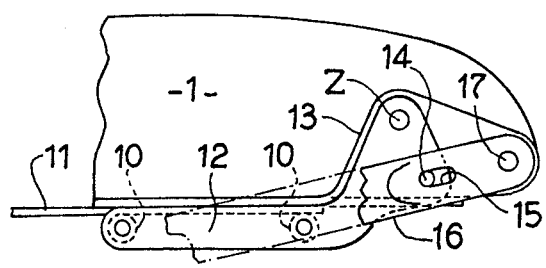

CONVERTIBLE SEAT STRUCTURES FOR AUTOMOBILE VEHICLES

DESCRIPTION

The present invention relates to convertible seat structures, such as those employed in particular at the rear of semi-utility vehicles or breaks. It applies more particularly to seat structures of the type comprising a seat which is mounted in such manner as to be pivotable through about 180° about a transverse axis located in the vicinity of its front part and a backrest which is capable of being folded over forwardly through about 90° about a transverse axis located adjacent its lower part. The seat structure may thus occupy a normal position in which it performs its seat function, and a utility position in which it clears a larger loading volume.

The object of the invention is to provide such a seat structure with particularly simple means satisfying the following conditions:
it permits an easy handling of the seat;
it ensures the front support of the seat in its utility position;
it protects the rear side of the backrest of an adjacent front seat structure when the rear seat structure is in the utility position.

To achieve this, a seat structure of the aforementioned type is so arranged that, on at least one side of the seat, there is disposed an actuating handle which is mounted on the seat to pivot about a transverse axis, this handle being associated with a protecting panel which is disposed flat under the seat in the normal position of use and is raisable so as to be roughly perpendicular to the seat in the utility position, the handle defining a support surface for the seat in the utility position.

One embodiment of the invention will be described in the ensuing description with reference to the accompanying drawings in which:

FIG. 1 is a perspective side elevational view of a rear seat structure of a vehicle in its normal position of use;

FIG. 2 is a view of the same seat structure in the course of its conversion;

FIG. 3 shows the seat structure in the utility position thereof;

FIG. 4 shows the other side of the seat structure in the utility position thereof in the case where the rear seats are separate, and FIGS. 5 and 6 show in side elevation a detail of FIG. 4 in respect of two different positions of the seat.

The drawings show a rear seat structure for a vehicle comprising a seat 1 and a backrest 2.

The seat 1 is mounted in its front part to pivot about a transverse axis X—X between two supports 3, 4 which are fixed to the floor 5 of the vehicle.

The backrest 2 is mounted in its lower part to pivot about an axis Y—Y parallel to the axis X—X on supports such as 6 rigid with the body of the vehicle.

An actuating handle 7 is disposed on the side of the seat close to the door or the adjacent lateral wall of the vehicle. This handle is mounted to pivot about an axis Z—Z, which is also a transverse axis, on a bracket 8 rigid with the bottom 9 of the seat. This bottom 9 is preferably planar.

Fixed on the handle 7 are two rods 10 which carry a protecting panel 11 which, in the normal position of use of the seat structure, is disposed flat under the bottom 9 of the seat.

On the side of the seat structure located near the centre of the vehicle (FIGS. 4 to 6), the rods 10 are fixed to an arm 12 which is mounted to be pivotable about the axis Z—Z on a bracket 13 rigid with with the bottom 9 of the seat. The arm 12 carries a pin 14 which is engaged in a slot 15 in a leg 16 which is pivoted to the bracket 13 at 17. This leg 16 is adapted to cooperate, by its free end portion 16$^a$ opposed to the pivot 17, with a support 18 which is fixed to the floor 9 and defines a recess 18$^a$.

The handle 7 comprises an extension 19 located beyond its pivot axis Z—Z and adapted to act as a leg for the seat 1 when the latter is in the utility position. In this position, the leg 19 cooperates with a support 20 which is fixed to the floor 9 and defines a recess 20$^a$.

A support 21 located vertically below the axis Z—Z acts as a support for the handle 7, and therefore for the seat 1, when the latter is in the normal position of use of the seat structure (FIG. 1).

As clearly shown in the Figures, when the seat structure is placed in the normal position for receiving a passenger (FIG. 1), the handle 7 rests on the support 21, the panel 11 is placed under the bottom 9 of the seat and the leg 16 is substantially horizontal alongside the seat (FIG. 5).

The handle 7 is used for swinging the seat forwardly. While swinging over the seat, the handle 7 is turned and this has for effect to swing up the panel 11 and the legs 19 and 16. At the end of the rotation of the handle, the panel 11 is placed in a substantially vertical position (FIG. 3) behind the backrest of the front seat structure, the seat bearing on the floor through the legs 16, 19 which cooperate with the supports 18, 20. The handle 7 also acts as a lateral retaining means for the loads carried by the floor which is formed by the rear side of the backrest and the bottom of the seat.

It will also be observed that, in the utility position, the supports 3 and 4 act as supports for the backrest 2 after it has been swung over in the forward direction, this backrest having for this purpose lateral flanges 22 or other suitable abutment means.

In the described embodiment, it has been assumed that the vehicle has at the rear two distinct individual seat structures. It will be understood that the invention is also applicable if the two seat structures are united into a single bench-type seat. In this case, it is desirable to place a handle, such as 7, on each side of the bench seat, so as to permit the conversion operation through either of the rear doors of the vehicle.

Having now described our invention what We claim as new and desire to secure by Letters Patent is:

1. A convertible seat structure, in particular for an automobile vehicle, the seat structure being convertible from a normal position of use to a utility position for increasing loading space and comprising a seat mounted to be pivotable through substantially 180° about a transverse axis located in the vicinity of a front part of the seat, a backrest which is capable of being swung over forwardly through substantially 90° about a transverse axis located adjacent a lower part of the backrest, a mechanism comprising an actuating handle located on at least one side of the seat structure and mounted on the seat to pivot about a transverse axis, and a protecting panel which is disposed flat under the seat in said normal position of use and is raisable so as to be roughly perpendicular to the seat in said utility position, the panel being associated with the handle for being shifted by the handle, and the handle defining a support surface for the seat in said utility position.

2. A seat structure as claimed in claim 1, constituting a bench-type seat structure, wherein two of said mechanism are disposed symmetrically on both sides of the seat structure.

3. A seat structure as claimed in claim 1, constituting an individual seat structure, comprising an arm mounted on the seat to pivot about the pivot axis of the handle and located on a side of the seat adjacent the centre of the vehicle, the panel being rigid with the arm, a pin carried by the arm, and a leg pivotally mounted on the seat and defining a slot, the pin being engaged in the slot.

4. A seat structure as claimed in claim 3, wherein the arm and the leg are pivotally mounted on a common member which is rigid with a bottom part of the seat.

5. A seat structure as claimed in any one of the claims 1 to 4, wherein the handle acts as a lateral abutment for a load in said utility position.

6. A seat structure as claimed in claim 3, in combination with an automobile vehicle having a floor, wherein two supports carried by the floor receive the leg in said utility position.

7. A seat structure as claimed in claim 6, comprising two second supports which are carried by the floor and act as a support for the backrest in said utility position, the seat being pivotable between said two second supports.

8. A seat structure as claimed in claim 6, comprising a third support which is carried by the floor and against which third support the handle bear in said utility position.

* * * * *